United States Patent
Li

(10) Patent No.: US 12,156,304 B2
(45) Date of Patent: Nov. 26, 2024

(54) DUAL-LINE PROTOCOL READ-WRITE CONTROL CHIP, SYSTEM AND METHOD

(71) Applicant: SHENZHEN SUNMOON MICROELECTRONICS CO., LTD., Guangdong (CN)

(72) Inventor: Zhaohua Li, Guangdong (CN)

(73) Assignee: SHENZHEN SUNMOON MICROELECTRONICS CO., LTD., Shenzhen (CN)

( * ) Notice: Subject to any disclaimer, the term of this patent is extended or adjusted under 35 U.S.C. 154(b) by 297 days.

(21) Appl. No.: 17/914,760

(22) PCT Filed: Feb. 9, 2021

(86) PCT No.: PCT/CN2021/076152
§ 371 (c)(1),
(2) Date: Sep. 26, 2022

(87) PCT Pub. No.: WO2021/196902
PCT Pub. Date: Oct. 7, 2021

(65) Prior Publication Data
US 2023/0130994 A1    Apr. 27, 2023

(30) Foreign Application Priority Data
Mar. 30, 2020   (CN) .......................... 202010240354.9

(51) Int. Cl.
H05B 45/10    (2020.01)
(52) U.S. Cl.
CPC ................................... H05B 45/10 (2020.01)

(58) Field of Classification Search
CPC .......... H05B 45/10; H05B 45/30; Y02B 20/40
See application file for complete search history.

(56) References Cited

U.S. PATENT DOCUMENTS

| | | | |
|---|---|---|---|
| 2009/0222616 A1* | 9/2009 | Yano | G06F 12/0246 711/135 |
| 2010/0134514 A1* | 6/2010 | Woo | G09G 3/3648 345/589 |
| 2018/0233089 A1* | 8/2018 | Okamoto | G02F 1/13439 |
| 2018/0315390 A1* | 11/2018 | Kong | G09G 3/3688 |

FOREIGN PATENT DOCUMENTS

| CN | 101969721 A | 2/2011 |
|---|---|---|
| CN | 107809395 A | 3/2018 |

* cited by examiner

Primary Examiner — Minh D A

(57) ABSTRACT

A dual-line protocol read-write control chip, system and method. Said chip comprises: two front-stage ports, two rear-stage ports, a protocol decoding module, a data forwarding module, a read-back control module, a display control module, a gradient control module and an instruction control module; data is input to a chip based on a dual-line transmission protocol; after the chip decodes the data, the instruction control module controls a corresponding module according to the decoded instruction data; the data forwarding module forwards the data to a next-stage chip; in a read-back mode, the input and output ports of the chip are interchanged, so that corresponding state parameters can be read back from the chip, and then the working state of the chip is adjusted, and the gray scale of an LED light can be directly controlled according to the decoded gray scale data.

12 Claims, 1 Drawing Sheet

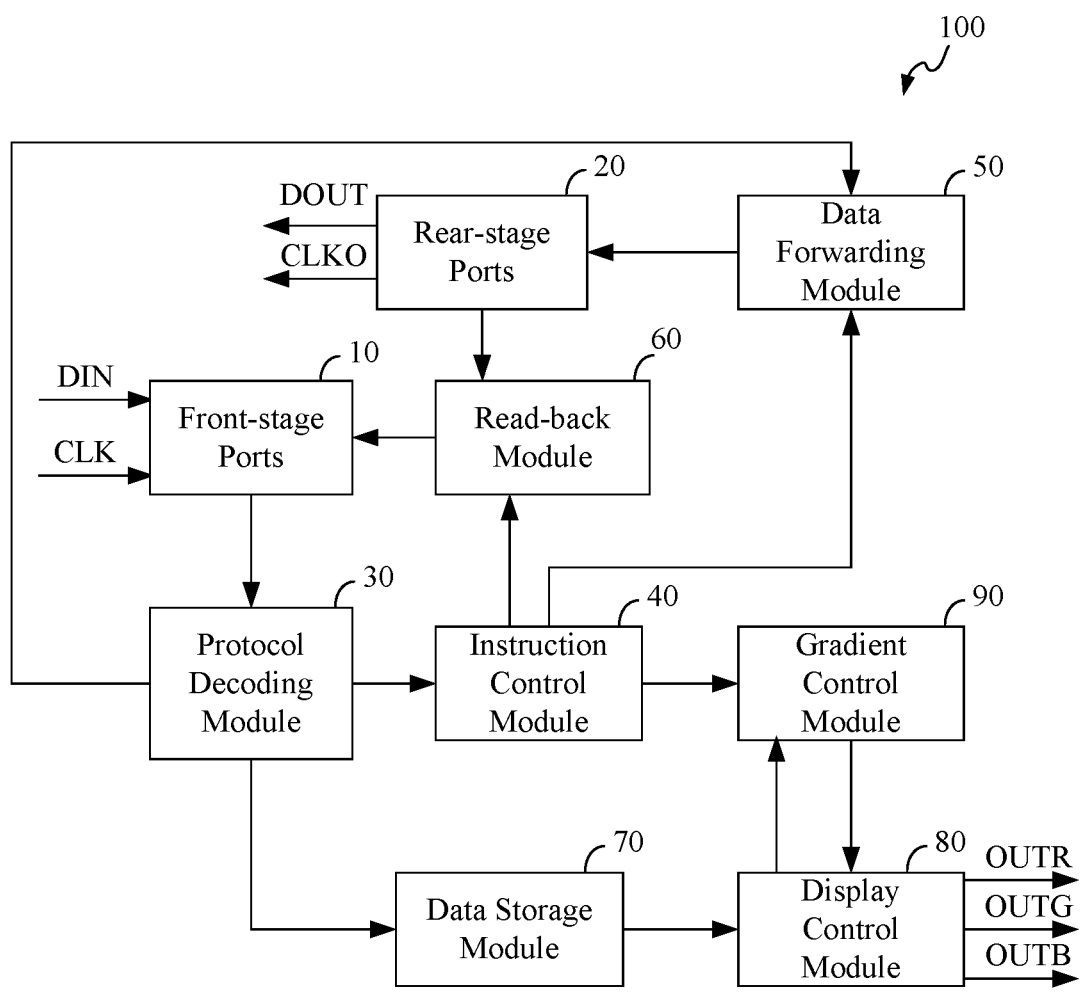

DUAL-LINE PROTOCOL READ-WRITE CONTROL CHIP, SYSTEM AND METHOD

FIELD

The present application relates to LED (light-emitting diode) control technologies, and in particular, to a dual-line protocol read-write control chip, system and method.

BACKGROUND

With advancement of technology and improvement of people's living needs, semiconductor lighting has developed rapidly, and it has also been regarded as one of key areas for upgrading traditional industries and cultivating emerging industries, which provides an excellent opportunity for development of intelligent lighting industry. With increase in application of LED lights and development of Internet and intelligent technology, intelligent lighting will usher in new development, the market will continue to grow, and the prospect is worth looking forward to. The economy continues to grow rapidly, and the shortage of power supply is becoming more and more serious. Intelligent lighting materials have excellent properties such as energy saving and long life and are widely used. The intelligent lighting industry has a good space for development. In addition, personalized lighting has become a development trend. A combination of intelligent technology and lighting technology enables lighting to further meet the lighting needs of different individuals and groups at different levels. It has evolved from meeting basic needs to meeting individual and personalized needs. More personalized requirements to an LED light requires an LED control chip to add intelligent adjustment functions, which can more easily control dimming of the lamp and parameter read-back, and so on.

SUMMARY

A technical problem to be solved by the present application is to provide a dual-line protocol read-write control chip, system and method with regard to the above-mentioned requirements of the prior art.

According to an aspect of the present application, a dual-line protocol read-write control chip is provided, comprising:
- two front-stage ports, configured to cascade with a previous-stage chip or connect to a main control circuit;
- two rear-stage ports, configured to cascade with a next-stage chip;
- a protocol decoding module, connected to the two front-stage ports, and configured to decode data received by the two front-stage ports based on a dual-line protocol;
- a read-back control module, connected to the two front-stage ports and the two rear-stage ports, and configured to implement a read-back mode, wherein in the read-back mode, the two rear-stage ports are configured as input ports, and the two front-stage ports are configured as output ports, and data input to the two rear-stage ports and state parameters read from the present chip are sent to the two front-stage ports for delivery;
- a data forwarding module, connected to the protocol decoding module and the two rear-stage ports respectively, and configured to forward the data sent from the protocol decoding module to the two rear-stage ports for delivery; and
- an instruction control module, connected to the protocol decoding module, the data forwarding module and the read-back control module respectively, and configured to control the data forwarding module and the read-back control module according to instruction data decoded by the protocol decoding module.

Advantageously, the instruction control module is configured to control the read-back control module to enter the read-back mode after waiting for a period of time according to time requirement in a read-back instruction when receiving the read-back instruction sent by the protocol decoding module, and synchronously control the data forwarding module to stop data forwarding function.

Advantageously, the chip further comprises:
- a display control module, configured to control gray level of an LED light which is connected to the chip by controlling a switching time; and
- a gradient control module, connected between the display control module and the instruction control module, and configured to determine a current gray level of an LED light controlled by the display control module when a fade-in instruction decoded by the protocol decoding module is received by the instruction control module, and control the display control module to gradually increase the gray level of the LED light to a highest gray level starting from the current gray level, and configured to determine a current gray level of the LED light controlled by the display control module when a fade-out instruction decoded by the protocol decoding module is received by the instruction control module, and control the display control module to gradually reduce the gray level of the LED light to a lowest gray level starting from the current gray level.

Advantageously, the chip further comprises:
- a data storage module, connected to the protocol decoding module and the display control module, and configured to buffer grayscale data of the present chip decoded by the protocol decoding module, and distribute the grayscale data to different output channels through the display control module to control the LED light for dimming.

Advantageously, after the protocol decoding module decodes the data received by the two front-stage ports, the protocol decoding module first buffers grayscale data and instruction data of the present chip, and then sends the received data to the data forwarding module, and then writes the buffered grayscale data into the data storage module and sends the buffered instruction data to the instruction control module.

According to the other aspect of the present application, an LED control system is provided, comprising a plurality of cascaded dual-line protocol read-write control chips as described above, wherein two front-stage ports of a first-stage chip are connected to a main control circuit.

According to another aspect of the present application, an LED control method is provided, comprising: cascading a plurality of dual-line protocol read-write control chips as described above, with two front-stage ports of a first-stage chip being connected to a main control circuit; and sending by the main control circuit data of each of the chips to the first-stage chip together or one by one.

Advantageously, the method further comprises: when data of each of the chips needs to be read back, the main control circuit allocates a waiting time for each of the chips to enter a read-back mode in a read-back instruction sent to each of the chips, and the waiting time for a previous-stage chip to enter the read-back mode after receiving the read-back instruction is greater than the waiting time for a next-stage chip to enter the read-back mode after receiving the read-back instruction.

The dual-line protocol read-write control chip, the LED control system and method according to embodiments of the present application have the following beneficial effects: the present application relates to a dual-line protocol control chip with read-write function, wherein the data is input to the chip based on a dual-line protocol, and after the chip decodes the protocol data, the instruction control module controls corresponding modules according to the decoded instruction data, and the data forwarding module forwards the data to the next-stage chip, while in the read-back mode, the input and output ports of the chip are interchanged, and corresponding state parameters can be read back from the chip, and then the working state of the chip can be adjusted. Further, the grayscale of the LED light can be directly controlled according to the decoded grayscale data, and the instruction data can be sent to the chip based on the dual-line protocol. When the fade-in instruction is received, the gray level is gradually increased to the highest gray level, and when the fade-out instruction is received, the gray level is gradually reduced to the lowest gray level.

BRIEF DESCRIPTION OF THE DRAWINGS

In order to more clearly explain embodiments of the present application or technical solutions in the prior art, drawings used in the description of the embodiments or the prior art will be briefly introduced below. Obviously, the drawings in the following description are merely some embodiments of the present application. For those of ordinary skill in the art, other drawings can be obtained based on these drawings without creative efforts.

The sole FIGURE is a schematic diagram of a dual-line protocol read-write control chip according to an embodiment of the present application.

DETAILED DESCRIPTION

In order to facilitate understanding of the present application, the present application will be described more fully hereinafter with reference to the related drawings. Typical embodiments of the application are shown in the drawings. However, the present application may be embodied in many different forms and is not limited to the embodiments described herein. Rather, these embodiments are provided so that the disclosure to the present application will be thorough and complete. It should be understood that the embodiments of the present application and the specific features in the embodiments are detailed descriptions of the technical solutions of the present application, rather than limitations of the technical solutions of the present application. In the case of no conflict, the embodiments of the present application and the technical features in the embodiments may be combined with each other.

Unless otherwise defined, all technical and scientific terms used herein have the same meaning as commonly understood by one of ordinary skill in the art to which this application belongs. The terms used herein in the description of the present application are for the purpose of describing specific embodiments only, and are not intended to limit the present application.

Embodiment 1

Referring to the sole FIGURE, a dual-line protocol read-write control chip 100 of this embodiment comprises: two front-stage ports 10, two rear-stage ports 20, a protocol decoding module 30, an instruction control module 40, a data forwarding module 50, a read-back control module 60, a data storage module 70, a display control module 80, and a gradient control module 90.

Among them, the two front-stage ports 10 are configured to cascade with a previous-stage chip or connect to a main control circuit, as input ports of the present chip 100, and the two front-stage ports 10 will become output ports in a read-back mode. The two rear-stage ports 20 are configured to cascade with a next-stage chip, as output ports of the present chip 100, and the two rear-stage ports 20 will become input ports in the read-back mode.

The protocol decoding module 30, being connected to the two front-stage ports 10, is configured to decode data received by the two front-stage ports 10 based on a dual-line protocol. Specifically, after the protocol decoding module 30 decodes the data received by the two front-stage ports 10, the protocol decoding module 30 first buffers grayscale data and instruction data of the present chip 100, and then sends the received data to the data forwarding module 50, and then writes the buffered grayscale data into the data storage module 70 and sends the buffered instruction data to the instruction control module 40. According to the present application, after multiple chips are cascaded, it is only necessary to send the data of each chip to a first-stage chip together or one by one, because each chip will first buffer the grayscale data and the instruction data of the present chip and then forward the data to the next-stage chip, and then process the grayscale data and the instruction data. This ensures that the data can be delivered in time.

It should be noted that the dual-line protocol used in the present application can be any existing dual-line data transmission protocol, and the protocol decoding module 30 only needs to decode the data according to specifications of the dual-line data transmission protocol, such as the I2C protocol. Correspondingly, a DIN port and a DOUT port are data ports, and a CLK port and a CLKO port are clock signal ports. The grayscale data, a read-back instruction, a fade-in instruction, and a fade-out instruction, etc. involved in this embodiment can be defined in advance. For example, whether the data is the grayscale data or the instruction data can be identified according to a data header, and a specific gray level of the LED light or what kind of instruction can be identified according to a weight of the data, for example, 00000000 represents a 0th level, 00000001 represents a 1st level, and 00000010 represents a 2nd level, and so on.

The instruction control module 40, being connected to the protocol decoding module 30, the data forwarding module 50, the read-back control module 60 and the gradient control module 90 respectively, is configured to control the data forwarding module 50, the read-back control module 60 and the gradient control module 90 according to the instruction data decoded by the protocol decoding module 30.

Specifically, the instruction control module 40 is configured to control the read-back control module 60 to enter the read-back mode after waiting for a period of time according to time requirement in the read-back instruction when receiving the read-back instruction sent by the protocol decoding module 30, and preferably, when the instruction control module 40 controls the read-back control module 60 to enter the read-back mode, the instruction control module 40 synchronously controls the data forwarding module 50 to stop data forwarding. The instruction control module 40 is configured to notify the gradient control module 90 to increase the gray level of the LED light to a highest gray level when receiving the fade-in instruction sent by the protocol decoding module 30, and notify the gradient control module 90 to reduce the gray level of the LED light to a lowest gray level when receiving the fade-out instruction sent by the protocol decoding module 30.

The data forwarding module 50, being connected to the protocol decoding module 30 and the two rear-stage ports 20 respectively, is configured to forward the data sent from the protocol decoding module 30 to the two rear-stage ports 20 for delivery.

The read-back control module 60, being connected to the two front-stage ports 10 and the two rear-stage ports 20, is configured to implement the read-back mode. In the read-back mode, the two rear-stage ports 20 are configured as input ports, and the two front-stage ports 10 are configured as output ports, and data input to the two rear-stage ports 20 and state parameters read from the present chip 100 are sent to the two front-stage ports 10 for delivery.

For example, in the case that multiple chips 100 are cascaded, when the data of each chip needs to be read back, a data packet is sent to the first-stage chip. The data packet contains the read-back instructions for each chip, wherein a waiting time for each chip to enter the read-back mode is allocated in each read-back instruction for each chip, and the waiting time for a previous-stage chip to enter the read-back mode after receiving the read-back instruction is greater than the waiting time for a next-stage chip to enter the read-back mode after receiving the read-back instruction. In this way, by configuring the waiting time for read-back of each cascaded chip, the data of each chip can be read out stage by stage, that is, the state parameters of a last-stage chip are read out firstly, and then the state parameters of the previous-stage chips are read out in turn, until the state parameters of all the chips are read out. For example, in the case that m chips are cascaded, when the read-back instruction is received by the last-stage chip, the last-stage chip reads back the data after waiting for t1 time, and then a penultimate-stage chip reads back the data after waiting for t2 time, and so on, until the first-stage chip reads back the data after waiting for tm time, t1<t2< . . . <tm. After the state parameter data of all the chips are read out, working state of the chips can be adjusted in real time according to the state parameters of these chips. It is understandable that the waiting time of each chip can be reasonably configured according to the amount of read back data to ensure that each stage of chip has enough time to read back the data.

The display control module 80 is configured to control the gray level of the LED light connected to the chip 100 by controlling a switching time.

The data storage module 70, being connected to the protocol decoding module 30 and the display control module 80, is configured to buffer the grayscale data of the present chip 100 decoded by the protocol decoding module 30. The buffered grayscale data is distributed to different output channels through the display control module 80 to control the LED light for dimming. For example, there are n output channels, each channel is distributed with a-bit grayscale data, n and a are natural numbers, and the amount of data stored by the data storage module 70 is n*a, as shown in the FIGURE, there are three channels OUTR, OUTG, OUTB.

The gradient control module 90, being connected between the display control module 80 and the instruction control module 40, is configured to determine a current gray level of the LED light controlled by the display control module 80 according to information fed back by the display control module 80 when the fade-in instruction decoded by the protocol decoding module 30 is received by the instruction control module 40, and control the display control module 80 to gradually increase the gray level of the LED light to the highest gray level starting from the current gray level within a specified time. The gradient control module 90 is also configured to determine a current gray level of the LED light controlled by the display control module 80 when the fade-out instruction decoded by the protocol decoding module 30 is received by the instruction control module 40, and control the display control module 80 to gradually reduce the gray level of the LED light to the lowest gray level starting from the current gray level within a specified time.

For example, the gray level can be level 0 to level 255, wherein level 0 means off, and level 255 means full on. Each gray level can be realized by the switching time of a control signal output by the display control module 80. For example, the gray level may be adjusted by adjusting duty cycle of a PWM signal.

Embodiment 2

Based on the same inventive concept as described above, an LED control system according to an embodiment of the present application is provided, comprising a plurality of cascaded dual-line protocol read-write control chips 100 as described in the Embodiment 1. The two front-stage ports of each stage of chip are connected to the two rear-stage ports of the previous-stage chip, the two rear-stage ports of the last-stage chip are suspended, and the two front-stage ports of the first-stage chip are connected to the main control circuit. The data delivered to all the chips are controlled by the main control circuit, and the read-back data of all the chips are collected by the main control circuit.

Embodiment 3

Based on the same inventive concept as described above, an LED control method according to an embodiment of the present application is provided, comprising: cascading a plurality of the dual-line protocol read-write control chips 100 described in the Embodiment 1, with the two front-stage ports of the first-stage chip being connected to the main control circuit; and sending by the main control circuit the data of each of the chips to the first-stage chip together or one by one, wherein when the main control circuit needs to read back the data of each of the chips, the main control circuit allocates a waiting time for each of the chips to enter a read-back mode in the read-back instruction sent to each of the chips, and the waiting time for a previous-stage chip to enter the read-back mode after receiving the read-back instruction is greater than the waiting time for a next-stage chip to enter the read-back mode after receiving the read-back instruction.

For more content, reference may be made to the description of the Embodiment 1, which will not be repeated here.

To sum up, the dual-line protocol read-write control chip, the LED control system and method according to embodiments of the present application have the following beneficial effects: the present application relates to a dual-line protocol control chip with read-write function, wherein the data is input to the chip based on a dual-line protocol, and after the chip decodes the protocol data, the instruction control module controls corresponding modules according to the decoded instruction data, and the data forwarding module forwards the data to the next-stage chip, while in the read-back mode, the input and output ports of the chip are interchanged, and corresponding state parameters can be read back from the chip, and then the working state of the chip can be adjusted. Further, the grayscale of the LED light can be directly controlled according to the decoded grayscale data, and the instruction data can be sent to the chip based on the dual-line protocol. When the fade-in instruction is received, the gray level is gradually increased to the highest gray level, and when the fade-out instruction is received, the gray level is gradually reduced to the lowest gray level.

The foregoing description refers to various modules. These modules typically include hardware and/or combinations of hardware and software. These modules may also include readable media containing instructions (eg, software instructions) that, when executed by a processor, execute various functional features of the present application. Accordingly, unless expressly required, the scope of the present application is not limited by specific hardware and/or software features in the modules expressly mentioned in the embodiments. It should be pointed out that in the above description of the various modules, the modules are divided only for the purpose of clarification. However, in actual implementation, boundaries of the various modules may be blurred. For example, any or all of the functional modules herein may share various hardware and/or software elements.

The embodiments of the present application have been described above in conjunction with the accompanying drawings, but the present application is not limited to the above-mentioned specific embodiments, which are merely illustrative rather than restrictive. Under the inspiration of the present application, those of ordinary skill in the art can also make many forms without departing from the spirit of the present application and the scope protected by the claims, which all belong to the protection scope of the present application.

The invention claimed is:

1. A dual-line protocol read-write control chip, comprising:
   two front-stage ports, configured to cascade with a previous-stage chip or connect to a main control circuit;
   two rear-stage ports, configured to cascade with a next-stage chip;
   a protocol decoding module, connected to the two front-stage ports, and configured to decode data received by the two front-stage ports based on a dual-line protocol;
   a read-back control module, connected to the two front-stage ports and the two rear-stage ports, and configured to implement a read-back mode, wherein in the read-back mode, the two rear-stage ports are configured as input ports, and the two front-stage ports are configured as output ports, and data input to the two rear-stage ports and state parameters read from the present chip are sent to the two front-stage ports for delivery;
   a data forwarding module, connected to the protocol decoding module and the two rear-stage ports respectively, and configured to forward the data sent from the protocol decoding module to the two rear-stage ports for delivery; and
   an instruction control module, connected to the protocol decoding module, the data forwarding module and the read-back control module respectively, and configured to control the data forwarding module and the read-back control module according to instruction data decoded by the protocol decoding module.

2. The chip according to claim 1, wherein the instruction control module is configured to control the read-back control module to enter the read-back mode after waiting for a period of time according to time requirement in a read-back instruction when receiving the read-back instruction sent by the protocol decoding module, and synchronously control the data forwarding module to stop data forwarding function.

3. The chip according to claim 1, further comprising:
   a display control module, configured to control gray level of an LED light which is connected to the chip by controlling a switching time; and
   a gradient control module, connected between the display control module and the instruction control module, and configured to determine a current gray level of an LED light controlled by the display control module when a fade-in instruction decoded by the protocol decoding module is received by the instruction control module, and control the display control module to gradually increase the gray level of the LED light to a highest gray level starting from the current gray level, and configured to determine a current gray level of the LED light controlled by the display control module when a fade-out instruction decoded by the protocol decoding module is received by the instruction control module, and control the display control module to gradually reduce the gray level of the LED light to a lowest gray level starting from the current gray level.

4. The chip according to claim 3, further comprising:
   a data storage module, connected to the protocol decoding module and the display control module, and configured to buffer grayscale data of the present chip decoded by the protocol decoding module, and distribute the grayscale data to different output channels through the display control module to control the LED light for dimming.

5. The chip according to claim 4, wherein after the protocol decoding module decodes the data received by the two front-stage ports, the protocol decoding module first buffers grayscale data and instruction data of the present chip, and then sends the received data to the data forwarding module, and then writes the buffered grayscale data into the data storage module and sends the buffered instruction data to the instruction control module.

6. An LED control method, comprising: cascading a plurality of dual-line protocol read-write control chips according to claim 1, with two front-stage ports of a first-stage chip being connected to a main control circuit; and sending by the main control circuit data of each of the chips to the first-stage chip together or one by one.

7. The method according to claim 6, wherein the method further comprises: when data of each of the chips needs to be read back, the main control circuit allocates a waiting time for each of the chips to enter a read-back mode in a read-back instruction sent to each of the chips, and the waiting time for a previous-stage chip to enter the read-back mode after receiving the read-back instruction is greater than the waiting time for a next-stage chip to enter the read-back mode after receiving the read-back instruction.

8. An LED control system, comprising a plurality of cascaded dual-line protocol read-write control chips, wherein each of said chips comprises:
   two front-stage ports, configured to cascade with a previous-stage chip or connect to a main control circuit;
   two rear-stage ports, configured to cascade with a next-stage chip;
   a protocol decoding module, connected to the two front-stage ports, and configured to decode data received by the two front-stage ports based on a dual-line protocol;
   a read-back control module, connected to the two front-stage ports and the two rear-stage ports, and configured to implement a read-back mode, wherein in the read-back mode, the two rear-stage ports are configured as input ports, and the two front-stage ports are configured as output ports, and data input to the two rear-stage ports and state parameters read from the present chip are sent to the two front-stage ports for delivery;

a data forwarding module, connected to the protocol decoding module and the two rear-stage ports respectively, and configured to forward the data sent from the protocol decoding module to the two rear-stage ports for delivery; and an instruction control module, connected to the protocol decoding module, the data forwarding module and the read-back control module respectively, and configured to control the data forwarding module and the read-back control module according to instruction data decoded by the protocol decoding module;

wherein two front-stage ports of a first-stage chip are connected to a main control circuit.

9. The LED control system according to claim 8, wherein the instruction control module is configured to control the read-back control module to enter the read-back mode after waiting for a period of time according to time requirement in a read-back instruction when receiving the read-back instruction sent by the protocol decoding module, and synchronously control the data forwarding module to stop data forwarding function.

10. The LED control system according to claim 8, wherein each of said chips further comprises:

a display control module, configured to control gray level of an LED light which is connected to the chip by controlling a switching time; and a gradient control module, connected between the display control module and the instruction control module, and configured to determine a current gray level of an LED light controlled by the display control module when a fade-in instruction decoded by the protocol decoding module is received by the instruction control module, and control the display control module to gradually increase the gray level of the LED light to a highest gray level starting from the current gray level, and configured to determine a current gray level of the LED light controlled by the display control module when a fade-out instruction decoded by the protocol decoding module is received by the instruction control module, and control the display control module to gradually reduce the gray level of the LED light to a lowest gray level starting from the current gray level.

11. The LED control system according to claim 10, each of said chips further comprises:

a data storage module, connected to the protocol decoding module and the display control module, and configured to buffer grayscale data of the present chip decoded by the protocol decoding module, and distribute the grayscale data to different output channels through the display control module to control the LED light for dimming.

12. The LED control system according to claim 11, wherein after the protocol decoding module decodes the data received by the two front-stage ports, the protocol decoding module first buffers grayscale data and instruction data of the present chip, and then sends the received data to the data forwarding module, and then writes the buffered grayscale data into the data storage module and sends the buffered instruction data to the instruction control module.

\* \* \* \* \*